United States Patent [19]

Mair

[11] Patent Number: 4,702,896

[45] Date of Patent: Oct. 27, 1987

[54] THERMAL TREATMENT OF PHOSPHATE ROCK

[75] Inventor: Alexander D. Mair, Florence, Ala.

[73] Assignee: Tennessee Valley Authority, Muscle Shoals, Ala.

[21] Appl. No.: 902,721

[22] Filed: Sep. 2, 1986

Related U.S. Application Data

[63] Continuation-in-part of Ser. No. 648,412, Sep. 10, 1984, now Defensive Publication No. T105,602.

[51] Int. Cl.[4] ................................ C01B 25/16
[52] U.S. Cl. ................................ 423/167
[58] Field of Search ................................ 423/167

[56] References Cited

U.S. PATENT DOCUMENTS

| | | | |
|---|---|---|---|
| T105,602 | 7/1985 | Mair . | |
| 3,995,987 | 12/1976 | MacAskill | 34/10 |
| 4,017,585 | 4/1977 | Angevine et al. | 423/167 |
| 4,321,238 | 3/1982 | Henin | 423/167 |
| 4,325,928 | 4/1982 | Lowe | 423/320 |
| 4,389,380 | 6/1983 | Parks | 423/167 |

*Primary Examiner*—John Doll
*Assistant Examiner*—Wayne A. Langel
*Attorney, Agent, or Firm*—Robert A. Petrusek

[57] ABSTRACT

An improved, substantially more energy efficient, thermal treatment process for use on relatively high organic content phosphate rock is herein taught wherein such rock is heated in two stages under controlled conditions to thereby yield an improved calcined product rendered more suitable for subsequent processing into wet-process phosphoric acid by, for example, acidulation with a mixture of phosphoric and sulfuric acids. The two-stage thermal treatment of the instant invention has been demonstrated to be especially beneficial when applied to an apatitic phosphate rock possessing a high content of organic matter and a high degree of carbonate substitution in the apatite crystal lattice thereof. It now has been discovered that by utilizing heating conditions considerably milder than those that are suggested by the teachings of the prior art, the practice of the instant improved process requires less externally supplied energy that such prior art calcination processes while still yielding calcined products of at least, and in most cases, greater than equivalent quality.

19 Claims, No Drawings

THERMAL TREATMENT OF PHOSPHATE ROCK

The invention herein described may be manufactured and used by or for the Government for governmental purposes without the payment to me of any royalty therefor.

This application is a continuation-in-part of Ser. No. 648,412 filed Sept. 10, 1884, now Defensive Publication T 105,602, published July 2, 1985.

The present invention relates to an improved method for thermally treating phosphate rock of the type indigenous to North Carolina as well as certain other rock similar thereto, as for example, rock from Gafsa, Tunisia, which rock contains appreciable amounts of organic matter. It has long been known by those skilled in this art that such type of rock must first be subjected to a calcination treatment(s) in order to convert same into a more desirable intermediate product prior to the subsequent acidulation thereof in the processing of same into either phosphoric acid of superphosphate.

BACKGROUND OF THE INVENTION

1. Field of the Invention

When phosphate rock with a relatively high organic content, as for example, rock from North Carolina and the western United States, is utilized in the manufacture of wet-process phosphoric acid, such rock is preferably first thermally treated to remove therefrom such organic matter. In practicing the wet-process for effecting the manufacture of phosphoric acid, such resulting thermally treated rock is subsequently reacted in an acidulation step with a mixture of phosphoric and sulfuric acids followed by filtration of the resulting calcium sulfate formed in said acidulation step to produce a filtrate of phosphoric acid. It has long been known that residual organic matter in such phosphate rock may cause severe foaming and filtration problems during such acid manufacture. Sulfides present in such calcined rock are also known to cause filtration problems and said sulfides have for some time been suspect of causing marked increases in equipment corrosion when effecting the processing of such rock. A particularly objectionable characteristic of such high organic content rock is the attendant formation, during the calcination thereof, of what shall, for the sake of convenience, be hereinafter referred to and termed acid-evolved sulfide; i.e., the sulfide which is evolved as a noxious gas, such as hydrogen sulfide, during acidulation of the rock, which gas is known to be both a health and an environmental hazard. Acid-evolved sulfide can originate from many sources, usually after reaction of the source material during thermal treatment of the rock. Sources thereof include sulfur contained in gangue minerals, such as gypsum or pyrite, sulfur exsolved from the apatite crystal lattice during heating of the rock, elemental sulfur impurities, the generally high sulfur content of organic matter associated with phosphate rock, and sulfur derived from the fuel used in said thermal treatment.

Calcining of, for example, North Carolina rock, as practiced commercially at temperatures usually greater than 800° C., can virtually eliminate organic matter and sulfide formation, but such prior art practice unfortunately results in a calcined product exhibiting undesirably low effective surface areas (usually less than 0.4 $m^2/g$) resulting in turn in rather poor reactivity of the rock when mixed with acid, as for example, when subsequently utilized in the manufacture of phosphoric acid or superphosphate.

It has been suggested that to qualify as a truly improved thermal or calcination process for affecting rock of the type characterized herein, levels of acid-evolved sulfide and residual organic matter in the calcined rock product effected thereby should be minimized and at the same time the surface area of such resulting calcined phosphate rock intermediate product should advantageously be maintained at levels of greater than about 2 $m^2/g$ to ensure that same will exhibit improved and sufficient reactivity to acid attack in the subsequent manufacture of wet-process phosphoric acid.

It is to be herein emphasized that phosphate rock of the class generally known as francolites may be drawn from different rock deposits, and whether from the same deposit or from different deposits, may be found to contain a variety of organic matter concentrations, impurity mineral inclusions and substitutions in the francolite crystal lattice, and that these factors can contribute to a wide range of behavior patterns upon the thermal treatment thereof. I have found, in particular, that North Carolina phosphate rock and its contained organic matter is extremely sensitive to methods of thermal treatment and that application of prior art methods established with phosphate rock types from other deposits does not necessarily result in a satisfactory calcined product from North Carolina rock. Due to the high degree of carbonate substitution in the francolite lattice, use of high calcination temperatures on North Carolina rock is particularly undesirable; as referred to supra temperatures above 800° C. cause dramatic loss of surface area and consequently undesirably decreased reactivity during subsequent acidulation processes. Similarly, use of temperatures in the range of 700° C. to 800° C. can cause undesirable buildup of deleterious acid-evolved sulfide in the calcined product. In contrast, removal of organic carbon from such North Carolina rock is usually difficult in that the organic matter in the rock has a great propensity for formation of intractable char, which char can only be removed in a calcination process by heating to rather high temperatures.

In view of these conflicting heating requirements for producing, from rock of the type described, a desirable calcined intermediate product having both low organic and acid-evolved sulfide contents but with retained high surface area, the present invention has evolved as a new, novel, and energy-efficient method for thermally processing a "difficult" phosphate rock such as that from North Carolina.

DESCRIPTION OF THE PRIOR ART

A single-stage relatively low temperature procedure of heat treatment for phosphate rock has been proposed recently in U.S. Pat. No. 4,325,928, Lowe, Apr. 20, 1982, wherein rock from Florida, Israel, Jordan, and Morocco was heated at temperatures in the range of from about 380° C. to about 600° C. Although such a single-stage relatively low temperature treatment apparently works well with these particular types of rock, I have found that when North Carolina phosphate rock is subjected to such a single-step thermal treatment, an undesirably large proportion of organic matter therein has been found to be unaffected thereby, i.e., approximately 45 percent thereof remaining after one hour of such thermal treatment.

Multiple-staged fluidized bed calcination of particulate materials, including phosphate, has been described in U.S. Pat. No. 3,995,987, MacAskill, Dec. 7, 1976. In the process described therein, the temperature of the first heating stage is limited by the ignition temperature, i.e., about 600° C. of the preferred fuel, to wit, coal. This multi-stage approach has been improved upon recently in U.S. Pat. No. 4,389,380, Parks, June 21, 1983, wherein problems addressed in the present invention, namely, low rock reactivity and production of sulfides caused by calcination of phosphate rock, were also considered. The preferred conditions for calcination of North Carolina phosphate rock taught in '380 supra are a first-stage heat treatment for about one hour at a temperature in the range of from about 621° C. to about 638° C. followed by a second heat treatment for about 30 minutes at a temperature ranging from about 693° C. to about 721° C. On the other hand, use of much lower temperatures (350°–400° C.) in the first-stage treatment of North Carolina rock, as taught in the present invention, yields desirable calcined products with properties approximately equivalent to the products allegedly resulting by the practice of the process taught in '380, supra. A particularly advantageous characteristic of the present invention, in comparison with this prior-art process disclosed in '380 supra, is the considerable energy savings permitted by the use of such considerably milder heating conditions, to wit, (1) use of a substantially lower first-stage temperatures, and (2) the consequently shorter residence time (15 minutes), and the use of lower temperature (675° C.) herein found preferable for the second-stage heat treatment. Of course, the utilization of heat exchanging means in combination with (1) and (2), just above, would accomplish still greater conservation of external energy requirements, when compared to the energy requirements of the process taught by '380, supra.

SUMMARY OF THE INVENTION

According to the teachings of the present invention, a high quality calcined product suitable for wet-process phosphoric acid manufacture is produced from organic matter contaminated phosphate rock, particularly of the typed mined in North Carolina, by calcining the rock at low temperatures in two stages under carefully controlled conditions in order to simultaneously maximize organic matter removal, minimize formation of objectionable acid-evolved sulfide, maintain a high porosity with an associated surface area of at least 2 $m^2/g$, and minimize requirements for application of external energy thereto. A first-stage treatment conducted within a window of 350°–400° C. has been discovered to be particularly advantageous with this rock type, in that such a treatment minimizes crosslinking reactions in the residual organic matter and facilitates volatilization and removal of the organic residue during both the first and second heating stages.

OBJECTS OF THE INVENTION

In view of the foregoing, it is therefore a principal object of the present invention to provide an improved process for producing an improved calcined intermediate product from North Carolina and similar types of phosphate rock, which types of rock contain highly substituted francolites as the predominant source of phosphate of the ore values therein.

It is a further principal object of the present invention to provide a process for processing North Carolina and similar type phosphate rock wherein sufficient surface area and reactivity are maintained in the calcined intermediate product therefrom for satisfactory subsequent acidulation in wet-process phosphoric acid production processes.

Another object of the present invention is to provide a process wherein the undesirable organic impurities present in the North Carolina and like type phosphate rock are substantially eliminated and wherein any organic impurities remaining are converted to a form which is harmless and even beneficial to subsequent rock acidulation processes.

A still further object of the present invention is to provide a calcination process suitable for North Carolina and like type phosphate rock to minimize formation, in the calcined intermediate product, of undesirable and corrosive sulfides and precursors of noxious and toxic gases, such as hydrogen sulfide, which gases are subsequently liberated during acidulation of the resulting calcine when same is later processed in the production of wet-process phosphoric acid.

Still another object of the present invention is to provide an improved and more economical method for processing North Carolina and like type phosphate rock wherein the requirements for the use of external energy therefore, as for example, application of heat energy, are significantly less than those of prior-art calcination processes, presently used for processing of such type rock.

Still further and more general objects and advantages of the present invention will appear from the more detailed description set forth below, it being understood, however, that this more detailed description is given by way of illustration and explanation only, and not necessarily by way of limitation since numerous or various changes therein will undoubtedly be made by those skilled in the art without substantially departing from the true spirit and intended scope of the present invention.

DESCRIPTION OF THE PREFERRED EMBODIMENTS

The method comprising the principal embodiment of the instant invention comprises an initial heat treatment of North Carolina phosphate rock at bed temperatures ranging from about 350° C. to about 400° C. for periods of time ranging from about 30 to about 120 minutes followed by a second heat treatment thereof at bed temperatures ranging from about 650° C. to about 700° C. for periods of time ranging upwards to about 30 minutes. Initial calcination in the temperature range of from about 350° C. to about 400° C. has been found to be particularly advantageous, unexpectedly giving less residual organic matter and acid-evolved sulfide in the product calcine after the second heat treatment (a constant) than in products wherein the first-stage calcination temperature was either less than 350° C. or greater than 400° C. My associated experimental work on characterizing the residual organic matter in calcined North Carolina rock has demonstrated that the beneficial low temperature treatment found, i.e., 350° C. to 400° C. is optimal for minimizing crosslinking reactions in the residual organic matter, thereby making this residue less intractable and much more easily volatilized and removed during both the first and the second heating stages of my new and improved thermal treatment. The increased crosslinking and intractability in the organic matter caused by use of higher temperatures (greater than the herein specified maximum of 400° C.) in the first stage can only be surmounted by appreciably increasing this first-stage temperature up to at least about 650° C., together with the use of even much more drastic heating conditions in the second stage than are used in the present invention, in order to yield a calcined product of approximately equivalent quality as judged by comparison with products produced according to the teachings of the prior art in this area. Also, such practice of the prior art, i.e., with use of such significantly higher temperatures over and above those specified in the present invention, suffers the distinct disadvantage of significantly higher energy requirements than the practice of the present invention.

Although about half of the organic matter, as measured by residual organic carbon, is volatilized in the first stage of the present invention, a second thermal treatment of short duration at temperatures in the range from about 650° C. to about 700° C. is desirable to eliminate substantially the remainder of the organic matter, while at the same time minimizing both formation of additional acid-evolved sulfide and further decrease in phosphate rock effective surface area. The second-stage treatment of the instant invention is also advantageous in that it converts any residual organic matter to a carbonaceous char of high surface area, i.e., for example, greater than 300 $m^2/g$, which char is acid insoluble and readily filtered with calcium sulfate in a process whereby such thermally treated North Carolina phosphate rock is subsequently reacted with acid to manufacture phosphoric acid therefrom. Conversion of the residual organic matter to such an insoluble carbonaceous char eliminates foaming and filtration problems normally caused by such organic matter when in its original or less altered state. This high surface area carbonaceous char resulting from practice of the present invention, generated after the second heating stage thereof, is essentially what is known to those skilled in the art as an activated carbon. Thus, when the calcine is reacted with acid, presence of such carbonaceous char is also beneficial in that it will absorb traces of low molecular weight organic matter which may still reside in the calcined material, and which may otherwise cause foaming and filtration problems and discoloration of the resultant acid after the subsequent filtration thereof.

Under heating conditions yielding a desirable level of at least 2 $m^2/g$ for the surface area of the calcined product, the two-stage thermal treatment of the instant invention results in a superior calcine compared to a single-stage treatment of North Carolina phosphate type rock wherein heating conditions are identical to those used in the second stage of the instant two-stage treatment. Both organic carbon and acid-evolved sulfide levels in the calcined product, resulting from the practice of the instant invention, are significantly and beneficially lower using said two-stage heat treatment.

Use of higher bed temperatures or longer residence times than those specified in the present invention for the second heating stage may eliminate residual organic matter more completely; but such practice has deleterious effects on the calcined product in that undesirably high levels of acid sulfide are evolved therefrom or unacceptably low surface areas, of less than 2 $m^2/g$, result in the product, or both.

In the absence of other oxidants, the gaseous component in contact with the phosphate rock during a second stage of heat treatment should advantageously contain sufficient oxygen to oxidize all the residual organic matter and sulfide. Preferably an excess of oxygen is used.

Phosphate rock particularly suited to the instant two-stage thermal treatment are those sedimentary carbonate-phosphate apatites known as francolites, especially those with about 4 percent or more carbon dioxide substituting as carbonate in the apatite crystal lattice prior to any thermal treatment. Such rocks, for example, exist in the Pungo River Formation, as found in North Carolina, and in the Hawthorn Formation, as found in Florida. Also, particularly suited to said instant two-stage thermal treatment are phosphate rocks containing at least about 0.5 percent of organic matter, expressed as organic carbon, by weight, of the phosphate minerals in the feed material.

Either or both stages of the instant calcination treatment may be carried out on the phosphate rock as mined with associated gangue minerals all, or partially retained in the calcined feed, or on a rock concentrate wherein most of the nonphosphatic impurities (for example, quartz, calcite, and dolomite) are eliminated in a prior beneficiation process such as by froth flotation. Thermal treatment for either stage may be carried out in a fixed bed, rotary kiln, or with a dense or dilute phase fluidized bed. The first-stage heating process herein taught is not necessarily a preheating step to the second-stage, but may be a separate and distinct heating stage entirely independent of the second-stage with the possibility of completely cooling the treated rock between heating stages.

EXAMPLES

In order that those skilled in the art may better understand how the present invention can be practiced, the following examples are given by way of illustration only and not necessarily by way of limitation.

EXAMPLE I

In the pursuit of further information gathered for the purpose of more clearly defining the parameters effecting the practice of the instant invention the investigations herein were made to compare the effects of the instant two-stage process with treatment of but one each of these heating treatments. In the series of tests comprising this example the North Carolina phosphate rock, which was utilized therein and which was a double float concentrate, had the chemical and particle size analyses as shown in Table III, infra. Samples of the phosphate rock were heated in a fluidized bed reactor in air using a single or a two-stage thermal process under the conditions shown in Table I, infra.

TABLE I

| Sample | Calcination conditions |
|---|---|
| A | Not calcined |
| B | 60 minutes at 350° C. |
| C | 15 minutes at 675° C. |
| D | 60 minutes at 350° C. plus 15 minutes at 675° C. |

The fluidized velocity of the heated air in the bed for this and other examples was 16 cm/sec. Minimum fluidization velocity for said rock at room temperature was 5.3 cm/sec in air. Analyses on the untreated feed rock and the cooled calcined products are shown in Table II, infra:

TABLE II

| Sample | Organic Carbon (%) | Acid-evolved sulfide (%) | Surface area ($m^2/g$) |
|---|---|---|---|
| A | 1.25 | 0.01 | 18 |
| B | 0.50 | 0.02 | 22 |
| C | 0.53 | 0.22 | 4 |
| D | 0.26 | 0.09 | 5 |

This example illustrates the beneficial effect of the two-stage calcination treatment and compares such a treatment with each of the two identical heating treatments used alone. The two-stage treatment gives acceptable and appreciably lower levels of acid-evolved sulfide compared to the single-stage treatment at 675° C. and less residual organic carbon than either single-stage treatments, while maintaining an acceptably high surface area in the calcine. Moreover, the two-stage treatment beneficially converts the residual organic matter to a char of what is essentially an activated carbon.

In this and the following examples, concentrations of residual organic carbon and sulfide are expressed on a common basis as a weight percentage of the uncalcined rock, after correction for the weight lost during calcination.

TABLE III

| Analyses of North Carolina Phosphate Rock | | | |
|---|---|---|---|
| | Weight, % | Particle diameter (micrometers) | Weight, % |
| $P_2O_5$ | 30.3 | Greater than 1700 | 0.1 |
| CaO | 49.1 | 1180–1700 | 0.1 |
| MgO | 0.5 | 850–1180 | 0.5 |
| $Na_2O$ | 0.9 | 600–850 | 1.4 |
| $K_2O$ | 0.1 | 425–600 | 4.9 |
| $Al_2O_3$ | 0.5 | 300–425 | 16.9 |
| $Fe_2O_3$ | 0.7 | 212–300 | 36.8 |
| $SiO_2$ | 2.6 | 150–212 | 26.8 |
| F | 3.7 | 106–150 | 11.2 |
| S (total) | 1.1 | 75–106 | 1.2 |
| S (sulfate) | 0.7 | Less than 75 | 0.1 |
| $CO_2$ | 5.9 | | |
| Organic C | 1.25 | | |

EXAMPLE II

For the purposes of the investigations reflected in this example in the pursuit of further definition of the parameters referred to in Example I supra, samples of North Carolina rock as shown in Example I supra, were heated in air at various set temperatures between 300° C. and 550° C. for one hour and then were subjected to a second thermal treatment in a fluidized bed reactor at 700° C. in air for a period of time of about 15 minutes. Temperatures of the first treatment and analyses of the resulting cooled calcined products after two stages of thermal treatment were as shown in Table IV, infra:

TABLE IV

| First-stage temp (°C.) | Residual organic C (%) | Acid-evolved sulfide (%) | Surface area ($m^2/g$) |
|---|---|---|---|
| 300 | 0.16 | 0.21 | 3.85 |
| 350 | 0.15 | 0.14 | 3.75 |
| 400 | 0.23 | 0.15 | 3.70 |
| 450 | 0.23 | 0.18 | 3.52 |
| 500 | 0.25 | 0.19 | 3.67 |
| 550 | 0.32 | 0.21 | 3.51 |

The results from this example illustrates the unexpected advantage gained by preferentially calcining in the first stage within the temperature range of about 350° C. to 400° C. As demonstrated herein, both acid-evolved sulfide and residual organic carbon in the final calcined product are minimized when this temperature range is used in the first stage. By calcining within the window of 350° C. to 400° C., crosslinking reactions within the residual organic matter are minimized, making the organic residue less intractable and more easily volatilized and removed during both heating stages.

EXAMPLE III

Again, as in Example II supra, in the tests comprising this example, samples of the same North Carolina rock as shown in Example I supra, were heated in a fixed bed in air at 350° C. for 60 minutes and then reheated in air in a fluidized bed reactor at 700° C. for various residence times. The duration of the second thermal treatment and the analyses of the cooled calcined products were as shown in Table V, infra:

TABLE V

| Time at 700° C. (minutes) | Organic C (%) | Acid-evolved sulfide (%) | Surface area ($m^2/g$) |
|---|---|---|---|
| 5 | 0.40 | 0.08 | 6.7 |
| 15 | 0.13 | 0.13 | 3.6 |
| 60 | 0.09 | 0.14 | 1.6 |

The results from this example illustrates the effect of the duration of heating in the second thermal treatment stage. As may be appreciated from the results illustrated in Table V supra, the heating times should beneficially be kept short in that calcine surface area in undesirably low if the calcination time in the second stage is extended to about 60 minutes or longer.

EXAMPLE IV

Once again, as in Examples II and III supra, in the tests comprising this example, samples of North Carolina rock, as shown in Example I supra, were heated in a fluidized bed in air at 350° C. for 60 minutes and then reheated in air in a fluidized bed reactor for 15 minutes at various temperatures. The temperature of the second thermal treatment and the analyses of the cooled calcined products were as shown in Table VI, infra:

TABLE VI

| Temperature (°C.) | Organic C (%) | Acid-evolved sulfide, (%) | Surface area ($m^2/g$) |
|---|---|---|---|
| 700 | 0.16 | 0.14 | 3.8 |
| 750 | 0.10 | 0.17 | 1.0 |
| 800 | 0.04 | 0.10 | 0.38 |

The results from this example illustrates the effect of heating temperature in the second thermal treatment stage. The data therefrom demonstrate that temperatures above 700° C. produce unacceptably low calcine surface areas. The data also illustrate, vis-á-vis, the 750° C. calcine, that the most undesirable buildup of acid-evolved sulfide occurs when calcining is within the range between about 700° C. and about 800° C. The results from this example show that for an acceptable calcined product, the second-stage temperature should be maintained at about 700° C. or lower.

INVENTION PARAMETERS

After sifting and winnowing through the data supra, as well as other results and operation of my new, novel, and improved method for processing, by improved thermal treatment/calcining North Carolina and like type phosphate rock, I now present the acceptable and preferred parameters and variables as shown below:

| Calcination conditions | Operating range | Preferred (about) | Most Preferred |
|---|---|---|---|
| First stage | | | |
| Temperature (°C.) | 340–410 | 350–400 | 350–375 |
| Retention time (min) | 30–120 | 40–80 | 50–70 |
| Second stage | | | |
| Temperature (°C.) | 640–710 | 650–700 | 670–680 |
| Retention time (min) | 5–40 | 10–30 | 12–18 |
| Calcined product | | | |
| Surface area ($m^2/g$) | 1.6–7 | >2 | >3.5 |
| Acid-evolved sulfide (%) | 0–0.2 | <0.14 | <0.09 |
| Residual organic C (%) | 0–0.4 | <0.3 | <0.2 |

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. An improved process for double-stage calcining organic matter contaminated phosphatic apatite rock of the mineral class generally known as francolites, said improved process resulting in the effecting of an intermediate phosphate rock calcine in a form eminently suitable for the subsequent acidulation thereof to wet-process phosphoric acid, said improved process resulting in substantially minimizing requirements for application of external energy thereto, and said improved process comprising:

(a) initially thermally treating said rock within the temperature range of 340° C. to 410° C. for a period of time ranging from 30 to 120 minutes, said rock characterized by having as the amount of organic matter thereof, before thermal treatment thereof, of at least one-half of one percent, expressed as organic carbon, by weight of the phosphate mineral in said feed rock; and (b) subsequently thermally treating the resulting initially thermally treated rock within the temperature range of 640° C. to 710° C. for a period of time ranging from 5 to 40 minutes;

said improved process characterized by the fact that said double-stage calcining of said organic matter contaminated phosphatic apatite rock is effected in such a manner so as to produce therefrom a resulting calcined phosphate rock product having substantially all the congeneric organic matter eliminated therefrom, having acid-evolved sulfide formation therefrom substantially minimized, and maintaining a substantial porosity thereof to thereby effect a surface area of at least 2 $m^2/g$.

2. The improved process of claim 1 wherein step (a) thereof, the duration of said initial thermal treatment ranges from about 40 to about 80 minutes.

3. The improved process of claim 2 wherein step (a) thereof, the duration of said initial thermal treatment ranges from about 50 to about 70 minutes.

4. The improved process of claim 1 wherein step (a) thereof, the temperature ranges from about 350° C. to about 400° C.

5. The improved process of claim 4 wherein step (a) thereof, the temperature ranges from about 350° C. to about 375° C.

6. The improved process of claim 1 wherein step (a) thereof, the duration of said initial thermal treatment ranges from about 40 to about 80 minutes and wherein the temperature ranges from about 350° C. to about 400° C.

7. The improved process of claim 6 wherein step (a) thereof, the duration of said initial thermal treatment ranges from about 50 to about 70 minutes and wherein the temperature ranges from about 350° C. to about 375° C.

8. The improved process of claim 1 wherein step (b) thereof, the duration of said subsequent thermal treatment ranges from about 10 to about 30 minutes.

9. The improved process of claim 8 wherein step (b) thereof, the duration of said subsequent thermal treatment ranges from about 12 to about 18 minutes.

10. The improved process of claim 1 wherein step (b) thereof, the temperature ranges from about 650° C. to about 700° C.

11. The improved process of claim 10 wherein step (b) thereof, the temperature ranges from about 670° C. to about 680° C.

12. The improved process of claim 1 wherein step (b) thereof, the duration of said subsequent thermal treatment ranges from about 10 to about 30 minutes and wherein the temperatures ranges from about 650° C. to about 700° C.

13. The improved process of claim 1 wherein step (b) thereof, the duration of said subsequent thermal treatment ranges from about 12 to about 18 minutes and wherein the temperature ranges from about 670° C. to about 680° C.

14. The improved process of claim 1, wherein said phosphate rock is a cárbonate phosphate apatite containing more than 4 percent by weight of inorganic carbonate, expressed as $CO_2$, within the crystal lattice of the purified apatite mineral prior to the double-stage calcining treatment thereof.

15. The improved process of claim 1, wherein the phosphate rock originates in the geological entity described as the Pungo River Formation as found in the state of North Carolina.

16. The improved process of claim 1, wherein the phosphate rock originates in the geological entity described as the Hawthorn Formation, as found in the state of Florida.

17. The improved process of claim 1 wherein the residual organic matter in the calcined rock is substantially a carbonaceous char of high surface area which char is water insoluble and is characterized by the fact that it causes no foaming or filtration difficulties and no significant coloration in the filtrate when said resulting calcined intermediate product is subsequently reacted with phosphoric-sulfuric acid mixtures in the production of wet-process phosphoric acid.

18. The improved process of claim 1, wherein step (a) and/or step (b) are effected on phosphate rock as mined with associated gangue minerals all, or partially, retained in the feed thereto.

19. The improved process of claim 1, wherein step (a) and/or step (b) are effected on a feed of phosphate rock concentrate wherein a substantial portion of the non-phosphatic impurities have been previously eliminated in a beneficial process such as froth flotation.

* * * * *